United States Patent
Hagting et al.

(10) Patent No.: US 6,236,860 B1
(45) Date of Patent: May 22, 2001

(54) METHOD FOR PERFORMING HANDOVER AND ROAMING IN A RADIO COMMUNICATION ENVIRONMENT

(75) Inventors: Marco Hagting; Michel Godefridus Jansen, both of Enschede; Petrus Hubertus Gerardus Van De Berg, Amsterdam, all of (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/051,661

(22) PCT Filed: Oct. 16, 1996

(86) PCT No.: PCT/EP96/04519
§ 371 Date: Apr. 16, 1998
§ 102(e) Date: Apr. 16, 1998

(87) PCT Pub. No.: WO97/15160
PCT Pub. Date: Apr. 24, 1997

(30) Foreign Application Priority Data

Oct. 17, 1995 (EP) .................................................. 95202806

(51) Int. Cl.[7] ................................ H04Q 7/20; H04Q 7/00
(52) U.S. Cl. .................... 455/436; 455/422; 455/434; 455/452; 370/331; 370/337
(58) Field of Search .................................... 455/403, 422, 455/426, 432, 434, 436, 450, 451, 462, 464, 509, 517, 552, 524, 525, 560, 561, 452; 370/329, 331, 337, 347, 465

(56) References Cited

U.S. PATENT DOCUMENTS

| | | | |
|---|---|---|---|
| 4,352,955 | * 10/1982 | Kai et al. | 455/434 |
| 4,485,486 | * 11/1984 | Webb et al. | 455/450 |
| 4,628,152 | 12/1986 | Åkerberg | 379/51 |
| 4,712,229 | * 12/1987 | Nakamura | 455/450 |

(List continued on next page.)

FOREIGN PATENT DOCUMENTS

| | | |
|---|---|---|
| 682867 | 11/1993 | (CH) . |
| 430106 | 6/1991 | (EP) . |
| 2281177 | 2/1995 | (GB) . |
| WO94/00946 | 1/1994 | (WO) . |

OTHER PUBLICATIONS

International Preliminary Examination Report re PCT/EP/96/04519 Date of submission of the demand: Apr. 24, 1997.
C. Buckingham et al., "A Business Cordless PABX Telephone System on 800 MHz Based on the DECT Technology", IEEE Communications Magazine, Jan. 29 (1991), pp. 105–110.
D. Åkerberg, "Novel Radio Access Principles Useful for Third Generation Mobile Radio Systems", IEEE Communications (1992), pp. 4–9.

*Primary Examiner*—Nay Maung
(74) *Attorney, Agent, or Firm*—Burns, Doane, Swecker & Mathis, L.L.P.

(57) ABSTRACT

The invention relates to duplex radio communication systems comprising radio access units and at least one remote radio access units operating in a time asynchronous manner. The radio environment is scanned for radio links operating in a synchronous or an asynchronous manner to a particular radio communication unit. Handover to a synchronous link can be performed in a seamless manner using a single timing reference. There is also provided a method for initiating handover and roaming in an asynchronous radio environment. A call with a remote unit is handed over from a first radio access unit to a second radio access unit by suspending transmission of the remote unit at a first radio link while maintaining the transmission at this first radio link by the first radio access unit is established by the remote unit and the call is resumed at the second radio link after which the radio link is released by the first radio access unit.

21 Claims, 6 Drawing Sheets

U.S. PATENT DOCUMENTS

| | | | |
|---|---|---|---|
| 4,731,812 | 3/1988 | Åkerberg | 379/61 |
| 4,771,448 * | 9/1988 | Koohgoli et al. | 455/450 |
| 4,866,710 * | 9/1989 | Schaffer | 455/450 |
| 5,214,790 | 5/1993 | Kozlowski et al. | 455/34.1 |
| 5,260,988 * | 11/1993 | Schellinger et al. | 455/464 |
| 5,297,190 * | 3/1994 | Ito | 455/464 |
| 5,488,649 * | 1/1996 | Schellinger | 455/464 |
| 5,574,727 * | 11/1996 | Fujino | 455/464 |

* cited by examiner

METHOD FOR PERFORMING HANDOVER AND ROAMING IN A RADIO COMMUNICATION ENVIRONMENT

FIELD OF THE INVENTION

The present invention relates generally to wireless telecommunication systems and, more specifically, to radio telecommunication systems for duplex radio communication between two or more units, at least one of which can be mobile.

BACKGROUND OF THE INVENTION

Wireless telecommunication systems, such as the well-known cellular and cordless telephone and data transmission systems, typically comprise a plurality of mobile or portable radio communication units and a plurality of radio access units. Each access unit provides a number of radio communication channels to a geographical area or cell defined by the operating ranges of the access unit. The access units are connected to a central interface unit, also called radio exchange (RE) or mobile telephone switching office (MTSO). The RE or MTSO are in turn coupled to a Public Switch Telephone Network (PSTN) or Integrated Services Digital Network (ISDN), in some cases via an intermediate Private (Automatic) Branch Exchange (P(A)BX), for completing telephone and data calls between mobile radio and landline subscribers.

Typical cellular communication systems provide coverage over a relatively wide area, i.e. relatively large cells. First generation cellular mobile networks provide service to macrocells having a range from the radio access unit to the cell boundary of 1 to 5 km, and large cells (5 to 35 km). Analogue cellular systems, such as designated AMPS, ETACS, NMT-450 and NMT-900 have been deployed throughout the world. Digital cellular systems are designated IS-54B in North America and the pan-European GSM system. These systems and others are described, for example, in the book titled "Cellular Radio Systems", by Balston et al., published by Artech House, Norwood, Mass., 1993.

Cordless radio communication systems, ranging from simple residential cordless telephones to business cordless communication systems capable of serving hundreds or even thousands of cordless radio communication units across (large) offices, production halls etc., have been developed for use in picocell (a few meters), nanocell (up to 10 m) and microcell (10 to 400 m) applications. Analogue cordless telephones are designated CT0, CT1 and CT1+. Amongst the digital cordless systems, designated CT2, CT2-CAI, CT3 and DECT (Digital Enhanced Cordless Telecommunications), both CT3 and DECT use TDMA (Time Division Multiple Access) as their transmission technique, whereas CT2 operates under FDMA (Frequency Division Multiple Access). In particular in North America, spread spectrum access is used for cordless radio communication. CDMA (Code Division Multiple Access) is another digital access technique which can be used for cordless communication. Reference is made to a paper by C. Buckingham et al., "A Business Cordless PABX Telephone System on 800 MHz Based on the DECT Technology", IEEE Communications Magazine, 29(1991) January, p. 105–110.

A further type of wireless communication system is called Radio in the Local Loop (RLL). RLL provides a radio link to complete the final connection between residential subscribers and the local exchange of a PSTN/ISDN, for example.

Within the concept of RLL, two basic systems can be distinguished: Fixed RLL (FRLL) and Mobile RLL (MRLL). In a telephony FRLL system, for example, the subscriber is provided with an ordinary telephone socket, however connected to a radio transceiver also called Fixed Access Unit (FAU) or Wireless Fixed Access Unit (WFAU). Via this FAU/WFAU a radio link is established with a radio access unit, which in turn is coupled to a central interface unit providing access to the PSTN/ISDN. In the MRLL concept, the subscriber is provided with a portable cordless or mobile radio telephone handset by which, via the radio access unit, access to the PSTN/ISDN can be established.

Mixed concepts are also possible, i.e. FRLL providing mobility in the subscriber premises, also called Cordless In The Home (CITH) and residential or neighbourhood mobility, also called Cordless In The Neighbourhood (CITN).

The radio access units in an RLL system may provide service to remote communication units in their respective coverage area, i.e. pico-, nano-, micro- or macrocell, dependent on the type of radio access unit used.

Different from landline connections, a call from a communication unit in a wireless radio communication system often has to change its radio communication link due to degrading link quality. This, for example, because another communication unit having a call in progress on the same radio link moves into the coverage of a particular communication unit, or if the communication unit itself moves out of the coverage area of the radio access unit to which it currently connects. The action of switching a call in progress from one or more physical radio links or channels to other physical radio links or channels is called handover. Such a handover can be solely completed within the radio access unit to which a radio communication unit is currently connected, a so-called "intra-cell handover". In case a call is continued via a radio access unit serving another cell of a particular radio communication system, this type of handover is called "Inter-cell handover". A call handover to another radio communication system is called "inter-system handover" or "external handover".

In the idle or standby mode of a radio communication unit, i.e. when no call is in progress, and the radio communication is moving, for example, location updates and other information and activities are performed by the radio communication unit, which process is called "roaming". Roaming within the same system is called "intra-system roaming" and roaming to another communication system is called "inter-system roaming" or "external roaming".

In a radio communication system operating in accordance with the DECT standard, for example, handover or roaming can be initiated by evaluating the received radio links with regard to the transmission quality of the radio links, using either one or a combination of the following criteria: RF signal level (RSSI), burst synchronisation (SYNC) error, system information field test word (A CRC) error, data field test word (X CRC) error. Besides transmission criteria, other parameters such as system identification, access rights etc. may be included in the decision of initiating handover or roaming.

In a radio environment in which all the radio access units are operated in a time synchronous manner, inter-cell and inter-system handover and roaming can be performed without timing reference constraints using one or a plurality of the above criteria. However, in large radio communication networks and in the case of access units connected to different networks or systems, a time synchronous operation of all the access units can be difficult to achieve or only with a high and costly effort.

To perform inter-cell and inter-system handover in an asynchronously operating radio environment, in order to transfer a call from a first radio access unit to a second radio access unit, adjustment of the timing reference of the radio communication unit is required in order to control the single transceiver devices of the radio communication unit to communicate with both the first and second radio access units during a certain period of time, i.e. during the call transfer phase.

Swiss patent CH 0,682,867 and British patent application GB-A-2,281,117 disclose methods for performing handover in a mobile radio telecommunication system, wherein a call without interruption of the ongoing service is transferred from a first radio link to a second radio link. A handover which does not cause a degradation of the service provided is called a "seamless handover".

To execute a seamless handover, during a certain period of time two duplex radio links between a radio access unit and a communication unit have to be maintained simultaneously. In the case of a handover request, the call at the first radio link is maintained while a second radio link is established. Only if data over the second radio link is successfully exchanged in both directions, the first radio link is terminated.

However, the majority of transceiver control devices used in current radio communication units are provided with a single timing reference to operate in time-synchronous radio networks. Due to lack of a second timing reference the transceiver control devices are not able to simultaneously support two or even more asynchronously operated radio links, as required for a seamless handover in an asynchronously operating radio environment.

In an asynchronously operating radio environment, handover by a radio communication unit having a single timing reference is effected by first releasing the existing or first radio link and thereafter establishing a new or second radio link with a second radio access unit while the call is temporarily suspended. Although this method can be used for inter-cell and inter-system handover in asynchronous radio environments it has a severe drawback in that when the set up of the new radio link fails, in particular in dense traffic areas, the first or any other radio link of the first radio access unit cannot be longer available for resumption of the call because it can be occupied by another call already, for example.

SUMMARY OF THE INVENTION

In view of the foregoing background, it is therefore an object of the present invention to improve handover of a call in a duplex radio communication unit, which improvement can be used in both synchronously and asynchronously operated radio environments.

It is in particular an object of the present invention to provide a method for improving handover of a call or roaming in an asynchronously operating radio environment without requiring additional circuitry.

It is also an object of the present invention to provide a radio communication unit and a radio access unit for use in an asynchronously operating radio environment.

According to the invention there is provided a scanning method for initiating handover of a call or roaming in a duplex radio communication system comprising radio access units and at least one remote radio communication unit. The radio access units and the or each remote radio communication unit being arranged for establishing a call at a radio link between a remote radio communication unit and a radio access unit, which radio link is selected from a plurality of predetermined radio links, and for switching a call in progress at a first radio link between a remote radio communication unit and a first radio access unit to a second radio link between the remote radio communication unit and a second radio access unit. In this radio communication system the or each, or clusters of access units are operated in a mutually time asynchronous manner forming an asynchronous radio environment. Under the assumption that the remote radio communication unit is synchronised to a first radio access unit, in the improvement according to the present invention the method comprises the following steps performed by the radio communication unit:

a) scanning the radio environment for radio access units which operate in time synchronous manner with the first radio access unit using a scan window having a width and/or position in time such to essentially retrieve synchronisation data and control data exchanged during a predetermined time period at a radio link operating time synchronous with the first radio link, b) scanning the radio environment for radio access units which operate in a time asynchronous manner with the first radio access unit using a scan window having a width and position in time such to retrieve synchronisation data and control data essentially exchanged outside the predetermined time period, c) maintaining a list of synchronous and asynchronous radio links available for handover, and d) evaluating the list on the basis of predetermined radio link criteria such to determine whether handover or roaming has to be initiated.

In the method according to the invention, a global air usage map of the radio environment of the radio communication unit is established, including synchronously as well as asynchronously operating radio links. The term synchronous refers in this case to those radio links which operate time synchronous with the radio access unit to which the radio communication unit is currently synchronised or locked.

When a handover or roaming has to be initiated, priority may be given to a handover to an acceptable but not the best synchronously operating radio link in terms of other link criteria such as radio link transmission quality parameters. This to be able to initiate a seamless handover for a radio communication unit having a single timing reference. Seamless handovers are preferred because a call in progress is not interrupted.

By a suitable positioning in time of the scan window with respect to the position of the synchronisation data at a radio link, there can be easily distinguished between synchronous and asynchronous radio links. However, in case such positioning is not possible, in a further embodiment of the invention, the time difference between the receipt of synchronising data at the various radio links is evaluated and used to distinguish between synchronous and asynchronous radio links.

In case of a handover to an asynchronous radio link, the respective time difference may be used for updating the timing reference of the radio communication unit. Such a timing reference update may be initiated in both a radio communication unit having a single or a double timing reference.

In a radio communication unit having a single timing reference, if a handover has to be provided, the timing reference is updated by the timing difference established, such to be adapted to the timing of a selected new radio link. In a radio communication unit having a first and second timing reference, the second timing reference may be updated by the timing difference to match the timing of the selected new radio link.

During the scan, the first or single timing reference is synchronised to the radio access unit to which the communication unit is synchronised or locked. This to guarantee that the remote radio communication unit is in a position of receiving or starting a call. Advantageously, the scanning rates at the steps a) and b) above may differ, such to save scarce battery power. The scanning rates may be adaptively set and the extent of a scan may be limited dependent on the number of available radio links, for example.

In a further embodiment the method according to the invention comprises the steps of:

e) suspending transmitting by the remote radio communication unit at the first radio link while maintaining transmitting by the first radio access unit at the first radio link, f) establishing the second radio link, g) resuming the call at the second radio link, and h) releasing the first radio link by the first radio access unit.

With this embodiment of the method according to the invention, by maintaining transmitting by the first access unit at the first radio link until the call is resumed at the second radio link, it is established that in case of failure in setting up the second radio link, the first radio link is still available for resumption of the call.

Because the remote radio communication unit stops transmitting at the first radio link, synchronisation with the first radio access unit has not to be maintained and the timing reference and transceiver control circuitry in the remote communication unit can be adjusted to set up the second radio link. This second radio link may be time asynchronous to the first radio link. It will be appreciated that this method of call handover can be performed by a radio communication unit having a single timing reference and transceiver control circuitry.

Although during handover the call can be temporarily suspended, in a further embodiment of the invention during steps e) and f) above, the first radio access unit maintains transmitting the call at the first radio link, and the remote radio communication unit maintains receiving the call at the first radio link.

This embodiment of the invention is based on the provision of transceiver control devices currently in use to receive data from asynchronous radio links without requiring additional timing references. Contrary to handover wherein the first radio link is completely released, in this further embodiment of the invention, during handover, a receive simplex radio link with the remote communication unit is maintained. For some types of data communication, for example, handover according to this embodiment of the invention does not cause any noticeable interruption at the side of the radio communication unit, i.e. a virtually seamless handover.

By forwarding, at the start of a handover, a transmit suspension message from the remote communication unit to the first radio access unit, a signalling message can be exchanged for the purpose of indicating to the parties involved that the call is subjected to handover. This signalling message may be transmitted by the radio access unit such that it can be received by the radio communication unit. At a terminal side, the signalling message may take the form of but not limited to a voice signal, an audio tone signal or a visual display signal. The signalling message is eventually released if the call is resumed.

It will be understood that at the remote communication unit the transmit suspension message may independently invoke an indication that the unit is subjected to handover.

Release of the first radio link after a successful handover may be executed by implementing a time-out period at the radio access units and/or via a release message from the second radio access unit to the first radio access unit.

The invention relates further to a remote communication unit, such as a radio telephone, and a radio access unit, such as a radio base station for use in a duplex radio communication system, in particular a cordless radio communication system, comprising control means adapted to operate following a method according to the present invention.

The above-mentioned and other features and advantageous of the invention are illustrated in the following description with reference to the enclosed drawings.

DETAILED DESCRIPTION OF THE EMBODIMENTS

Without the intention of a limitation, the invention will now be explained by its application in a cordless radio telephone system operating in accordance with the DECT standard. In short, DECT is a Multi Carrier/Time Division Multiple Access/Time Division Duplex (MC/TDMA/TDD) digital radio access technique, providing ten radio carriers, each divided into 24 time-slots which serve 12 duplex communication channels, called a frame.

Figure 1:
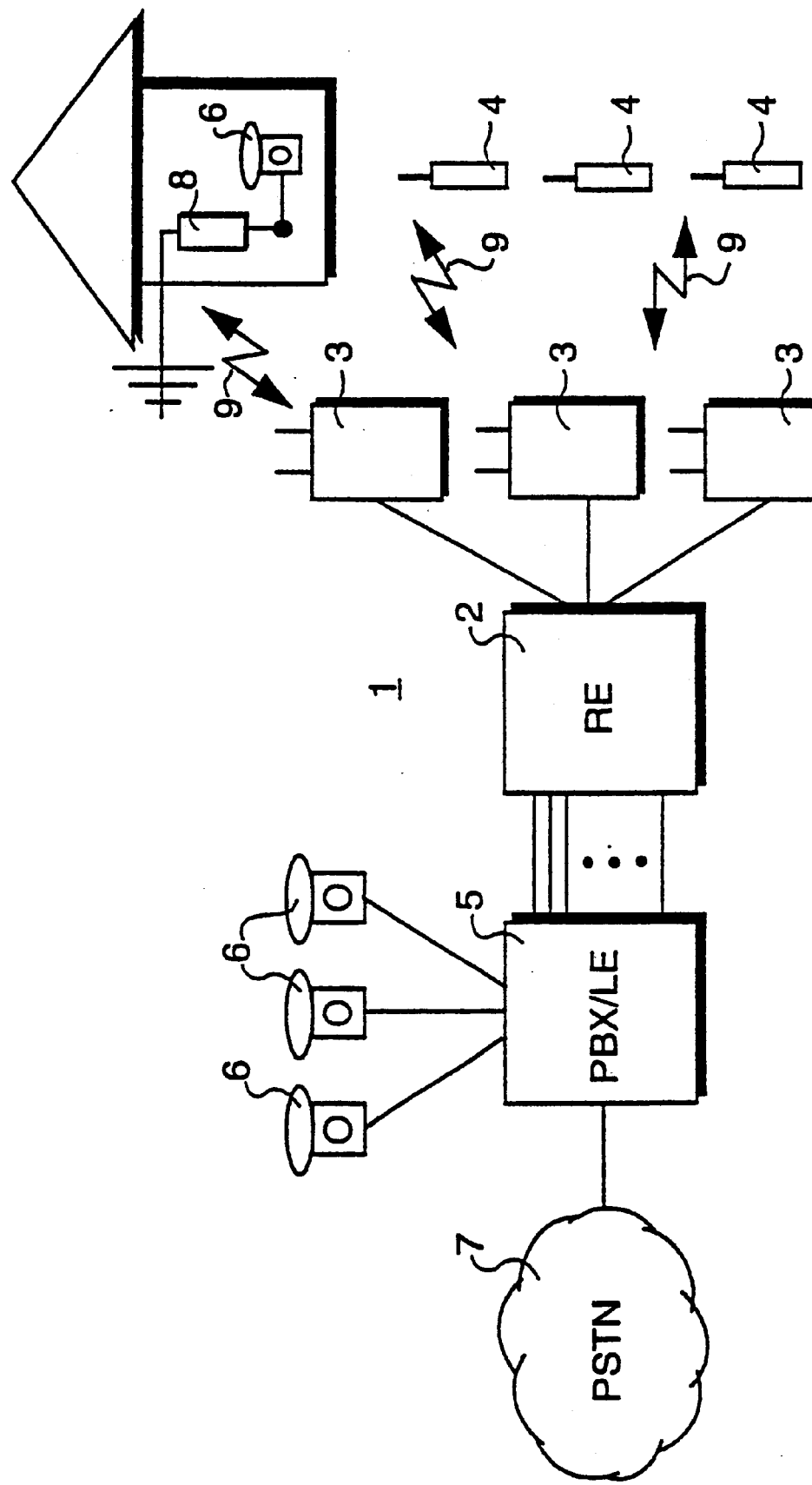
FIG. 1 shows, in a schematic and illustrative manner, a cordless telecommunication system in which the present invention can be used.

FIG. 1 illustrates a typical DECT radio communication system, generally designated with reference numeral 1. The system comprises three essential elements: a radio exchange (RE) 2, a plurality of compact radio access units or base stations 3, which are installed throughout the area to be covered and connect directly to the radio exchange 2, and remote cordless or wireless radio communication units in the form of portable telephones or handsets 4 which connect over a radio link 9 to the radio access units 3.

Each radio access unit 3 provides service to a given area, called a cell, which is surrounded and/or overlapped by other cells of other radio access units 3, i.e. a so-called multi-cell approach. The radius of indoor cells amounts typically from 10 m–100 m, whereas the radius of outdoor cells typically ranges from 200 m up to 5000 m.

The radio exchange 2 is connected to a wired exchange 5 to which a plurality of wired telephones 6 can be connected.

In business environments, this exchange 5 is generally a so-called Private Branch Exchange (PBX) whereas in outdoor applications, such as RLL or WLL, the exchange 5 is generally a Local Exchange (LE) which, like the PBX, is connected to a Public Switched Telephone Network (PSTN) 7, i.e. the ordinary wired public telephone network.

In RLL or WLL applications, the radio access units 3 may also connect over an air link 9 with so-called (Wireless) Fixed Access Units ((W)FAU) 8 which, in fixed RLL or WLL, connect to a fixed telephone terminal or socket for the connection of an ordinary wired telephone 6. In mobile RLL or WLL, providing local mobility in the home, for example, the FAU 8 is arranged to establish an air link with a handset 4 in the home (not shown).

Figure 2:
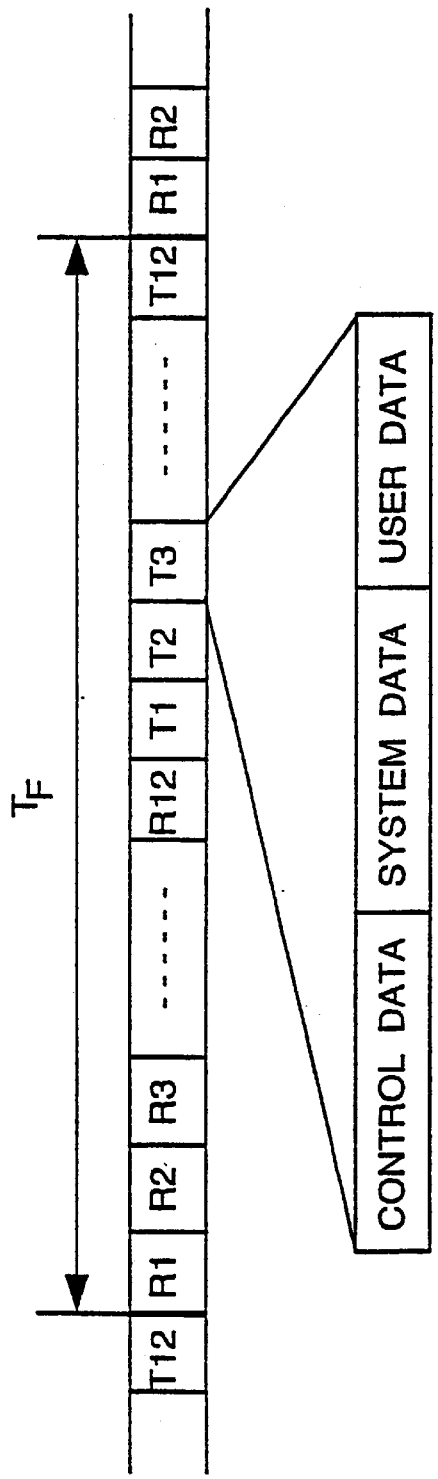
FIG. 2 shows, in a schematic and illustrative manner, a digital data stream comprising data bursts.

In DECT, the information over the air link 9 is transmitted using a frame structure shown in FIG. 2. During the first halve of the frame, i.e. the first twelve time-slots designated R1, R2, . . . R12, data from the radio access units 3 are received by the handsets 4 or (W)FAU 8, whereas in the second halve of each frame, i.e. the second twelve time-slots designated T1, T2, . . . T12, the remote communication units 4 or 8 transmit data to the radio access units 3. A radio communication link between a radio access unit 3 and a remote communication unit 4 or 8 is assigned a slot in the first halve of the frame and a slot bearing the same number in the second halve of the frame. Each time-slot typically contains control data, system data and information or user data.

Figure 3:
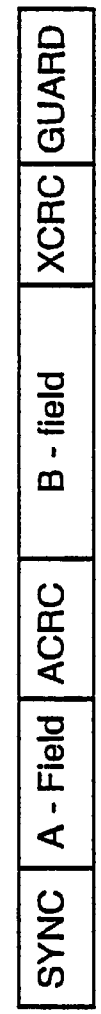
FIG. 3 shows in detail the structure of a data burst of FIG. 2.

A more detailed time-slot structure is shown in FIG. 3. The control data field contains a so-called synchronisation (SYNC) word, which has to be correctly identified at a radio access unit 3 or a remote communication unit 4, 8 in order to process the received data. SYNC data will typically need 16 bits, preceded by a preamble of 16 bits.

The system data field regularly contain system information on identity and access rights, services availability and, when required, information for handover to another communication channel in case of disturbances or transfer of a call to another radio access unit. Also paging and call set up procedures are carried over the system data field, which is also called A-FIELD. System data will typically need 64 bits with a 16 bit Cyclic Redundancy Check word designated ACRC.

The information or user data, also called B-FIELD, comprise in case of a telephone call digitised speech samples obtained during the frame cycle time $T_F$ of 10 ms. These speech samples are coded in accordance with the above-mentioned ADPCM coding algorithm CCITT Rec. G.726 having a typical bit rate of 32 kb/s. This means that for each speech call 320 bits have to be transmitted and received during every frame. The ADPCM coded B-FIELD data contain 80 speech samples of 4 bit each. These ADPCM data are formed from the difference of successive 8 bit wide PCM coded speech samples. The ADPCM quantization process is dynamically adapted to the momentary average signal level.

The B-FIELD data is scrambled and a 4 bit Cyclic Redundancy Check word designated XCRC is formed from the information data. Including guard space, the total number of bits per time slot according to the DECT standard amounts to 480. These bits are transmitted at a system dock frequency or system bit rate of 1152 kb/s.

The selection of a radio channel is based on the so-called Dynamic Channel Allocation (DCA) technique, in which a free radio link or communication channel amongst a plurality of radio links or communication channels common to all radio access units 3 or cells of the system is selected. DCA requires no channel or frequency planning and the like, and optimises the occupation of the available communication capacity of the system.

One of the basic features of the system is decentralised Continuous Dynamic Channel Selection (CDCS), a technique in which the handsets 4 or (W)FAU 8 selects the best available radio communication channel. With CDCS, channel selection is not limited to call set-up, but continues during the communication. CDCS optimises the radio link quality between a radio communication unit such as a handset 4 and a radio access unit 3 and the occupation of the available radio communication channels per cell. Reference is made to U.S. Pat. Nos. 4,628,152; 4,731,812 and a paper by D. Åkerberg, "Novel Radio Access Principles Useful for the Third Generation Mobile Radio Systems", The Third IEEE International Symposium on Personal, Indoor and Mobile Radio Communication, Boston Mass., Oct. 19–21, 1992.

DECT radio communication networks may comprise several DECT radio communication systems 1, which can be independently operated by one or more operators, for example. Further, several DECT radio communication systems 1 may be operated independently in the same geographical area.

In the case of synchronously operated systems, provisions are made to secure that the frames and time slots of the several units involved are exchanged following a common system timing. This implies that the timing references of the several radio access units and radio communication units have to be adjusted with a predetermined accuracy to the common system timing.

In the case of asynchronously operated systems, the transmit and receive data in frames and time slots of the radio access units of a network or clusters of radio access units belonging to several systems are not adjusted to a common system or network timing. Note that the radio access units in a particular cluster may operate synchronously.

Figure 5:
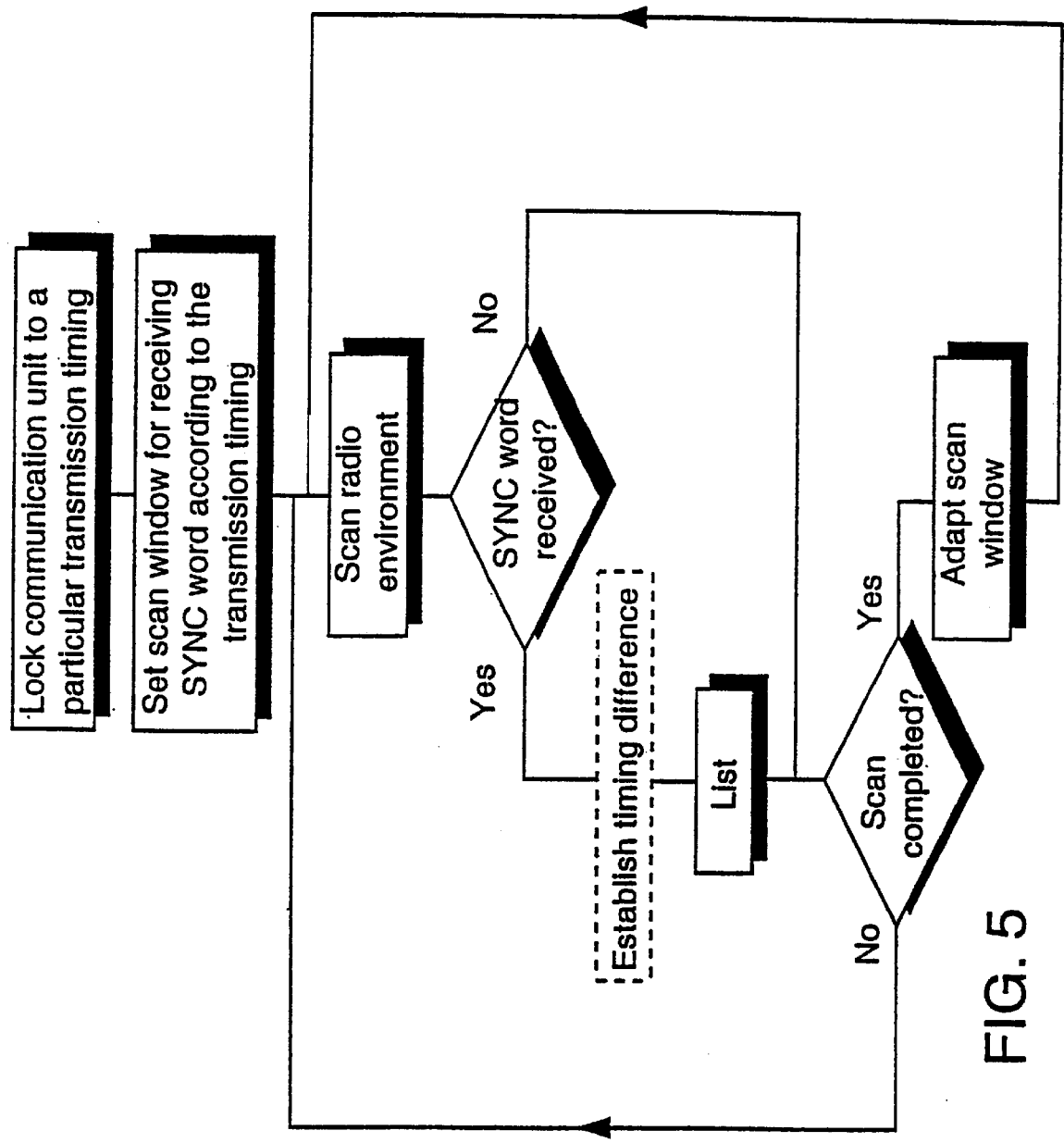
FIG. 5 shows a simplified flow chart diagram illustrating the scanning method according to the present invention.

As illustrated in the flow chart diagram of FIG. 5, in the scanning method according to the present invention synchronous radio links are detected by a radio communication unit 4, 10 by using a scan window having a width and position in time adjusted to the position and width of the SYNC data field in a receive time slot R1, R2, . . . R12; i.e. blocks "Lock communication unit to a particular transmission timing" and "Set scan window for receiving SYNC word according to transmission timing". Upon a successful detection of the SYNC word, i.e. block "Scan radio environment" and decision block "SYNC word received" answer "Yes", the radio link concerned will most probably belong to a system which operates time synchronous with the system to which the access unit or the radio communication unit is locked. In such case, the timing reference of a radio communication unit can be adjusted to the common system timing retrieved via the SYNC word. This action can be performed, for example, in the block "Scan radio environment".

Asynchronous radio links can be detected by using a scan window which, in principle, has to be as wide as a complete frame. This because the SYNC word of an asynchronous system can be positioned in time anywhere during the frame of a system to which the radio communication unit is synchronised or locked. Synchronous and asynchronous radio links can be distinguished by a suitable positioning of the scan window in time, such that the window is closed or not active during the time period of the SYNC word of the system to which the radio communication unit is currently locked. SYNC data received belongs then most probably to asynchronous radio links. This action can be performed in the blocks "SYNC word received?" and "Adapt scan window". Alternatively, or in addition to, by measuring the time difference between received SYNC words, i.e. block "Establish timing difference", there can be distinguished between several asynchronous systems, for example.

In this manner a complete map or list of the radio environment in terms of synchronous and asynchronous links for a radio access and/or a radio communication system can be provided, i.e. block "List".

During a scan, preferably all information with regard to the transmission quality of the several detected radio links should be retrieved and listed, such as RF signal level (RSSI), burst synchronisation (SYNC) error, system information field test word (A CRC) error, data field test word (X CRC) error. This can be performed, for example, by the block "Scan radio environment". By using a weighing scheme the need for a handover or roaming to a particular access unit or system can be initiated.

The decision to handover or roam may take into account other information than link quality as well, such as access rights, preferences of inter-cell or inter-system handover or roaming to synchronous radio links etc.

Further, the scanning may be adaptively adjusted to cope with the particular radio environment of a radio communication unit and communication characteristics. In the case of call pending, the scanning rate preferably has to be faster than in the waiting or idle mode of a communication unit, i.e. no call pending, for example. For making a list as to a suitable number of radio links available for handover, a full scan of all the available radio links is not always necessary. The scan can be stopped or limited if, for instance, a sufficient number of adequately radio links has been found, i.e. decision block "Scan completed?".

When the radio communication unit is switched on, or has been out of range for a longer time, an initial locking procedure has to be performed. It is preferred to scan first the entire radio environment. Synchronisation should be performed with respect to the strongest radio access unit. When a radio communication unit is synchronised or locked or has a call pending, scanning for synchronous radio links can be performed more often than scanning for asynchronous systems. This to enhance the possibility of retrieving a synchronous link to ensure as much as possible a seamless handover, if applicable. In the flow chart diagram shown in FIG. 5, these functions can be performed by a suitable setting of parameters in the blocks "Scan radio environment", "Adapt scan window" and "Scan completed".

Figure 4C:
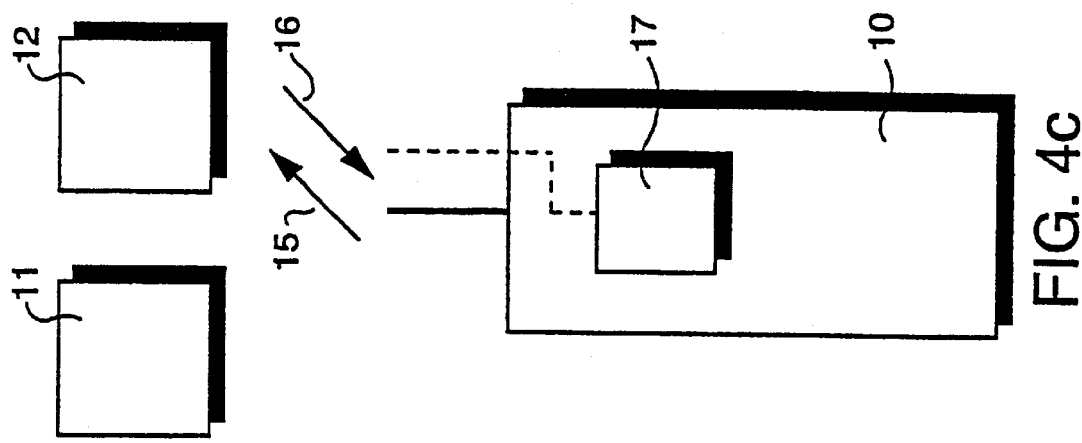
FIGS. 4a, 4b and 4c illustrate in a very schematic manner the method for call handover according to the present invention.
Figure 4B:
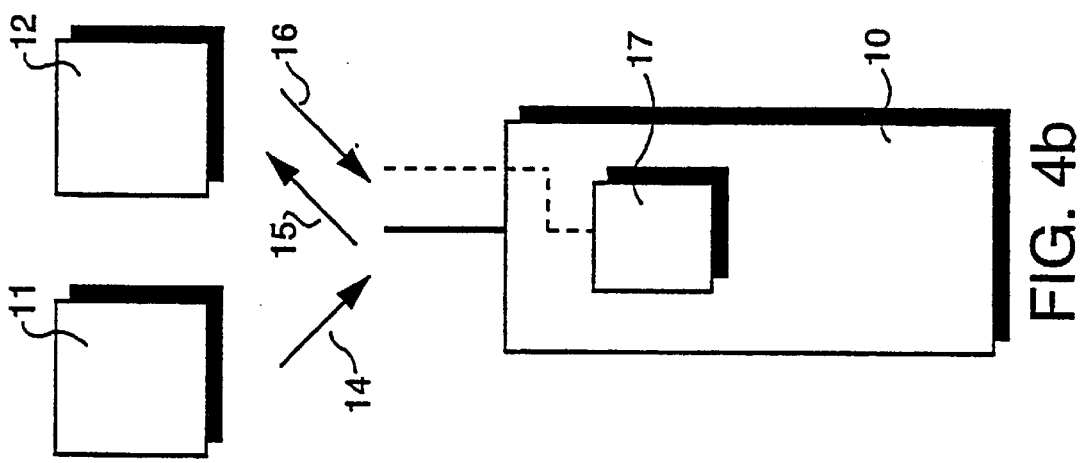
Figure 4A:
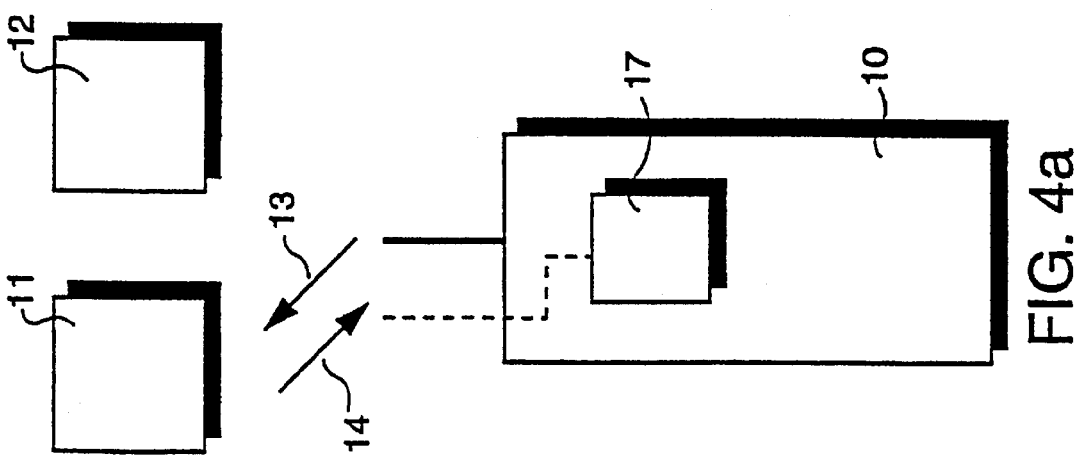

The method according to the present invention for handover of a call in progress from a first radio link to a second radio link is generally illustrated in FIGS. 4a, 4b and 4c.

FIG. 4a shows in a very schematic manner a radio communication system comprising a remote radio communication unit 10, such as a telephone handset 4 or a (W)FAU 8 shown in FIG. 1, and two radio access units 11 and 12. Arrows 13 and 14 represent a first duplex radio link carrying a call in progress between the radio communication unit 10 and the first radio access unit 11. The radio communication unit 10 comprises a timing reference 17 which is synchronised or locked to the radio access unit 11, as indicated by a dashed line. The radio communication unit 10 is also in the range of the second radio access unit 12. It is assumed that the radio access units 11 and 12 do not operate time synchronous.

Further, it is assumed that the radio communication unit 10 has to perform an inter-cell handover of the call from the first radio access unit 11 to the second radio access unit 12. This because the user of the radio communication unit 10 is moving in the direction of the second radio access unit 12 or that the radio path between the radio communication unit 10 and first radio access unit 11 is suddenly blocked, for example.

From the list of available radio links retrieved from a previous scan of the radio environment, a suitable second duplex radio link 15, 16 is selected by the radio communication unit 10 and it starts to occupy this second radio link, however not before transmitting by the radio communication unit 10 at the first radio link 13, 14 is suspended. The first radio access unit 11, however, continues to transmit on the first radio link, indicated by arrow 14.

In order to establish the second radio link 15, 16 the radio communication unit 10 synchronizes its timing reference 17 to the second radio access unit, as indicated by the dashed line. If the second radio link 15, 16 is successfully established the call can be resumed and the first radio access unit 11 can cease its transmitting at the first radio link, either via a time out or upon receipt of message from the second radio access unit 12 indicating that the call has been taken over.

As shown in FIG. 4c, in the new situation the first radio access unit ceased its transmission at the first radio link 13, 14 whereas the radio communication unit 10 is now synchronised to the second radio access unit 12 and the second radio link 15, 16 which bears the call in progress.

During handover, i.e. FIG. 4b, the first radio access unit not only may continue to transmit on the first radio link in order to prevent in a DCA/CDCS channel selection environment occupation thereof by another radio communication unit, such to have a fall back possibility in case the second radio link cannot be established, but preferably may continue to transmit the call itself. By receiving the first radio link, for which the timing reference 17 of the radio communication unit 10 has not to be synchronised to the first radio access unit 11, a simplex radio link is maintained. Note that a wide scan window can be used for receiving the first radio link which is now asynchronous to the radio communication unit 10. In case the call has a strong simplex character, i.e. down loading of information from the radio access unit to the radio communication unit, the method of handover of the present invention will not cause any interruption in the service provided, such that one may speak of a virtual seamless handover.

For the purpose of indicating handover to a user or device involved in a call in progress, a transmit suspension message may be forward by the remote radio communication unit 10 before transmitting at the first radio link is suspended. This message can be used for signalling purposes to the end users and may take the form of a spoken message, a special tone or tone sequence, a text displayed at a terminal display etc. In the case of a remote radio communication unit 10 still receiving at the first radio link, this message can also received back by the radio communication unit 10.

Whenever the second radio link 15, 16 cannot be established it is preferred to resume the call at the first radio link 13, 14, if applicable. Otherwise a third radio link connecting to the first radio access unit has to be established.

When a call is resumed all the call control features, such as encryption and the like particular to the call, are started on the new radio link as well.

In case of an inter-system handover the same procedure will be followed as outlined above in connection with inter-cell handover. However, switching between different radio communication systems may be subject to additional access rights and the like.

Figure 6:
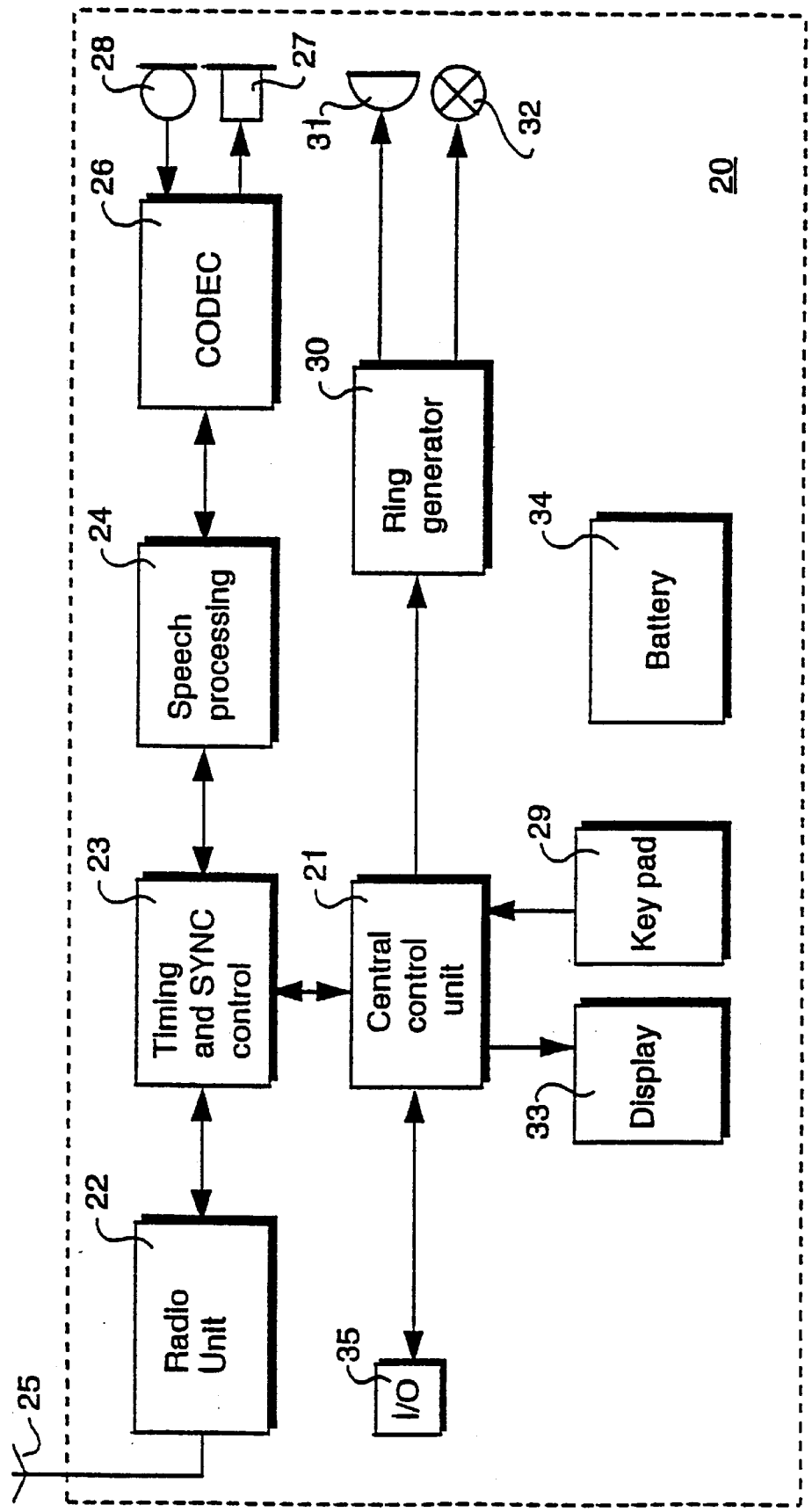
FIG. 6 shows a simplified block diagram of a radio communication unit taking the form of a telephone set operating according to the present invention.

FIG. 6 shows a simplified block diagram of a radio telephone set comprising frequency or clock control circuitry according to the present invention. The radio telephone set 20 has four essential building blocks, i.e. a central control and application logic unit 21, a radio unit 22, a timing and synchronisation control unit 23 and a speech processing unit 24.

The radio unit 22 comprises an air interface 25 having an antenna system coupled to a transceiver unit comprising a transmitter/modulator and a receiver/demodulator (not shown).

The timing and synchronisation control unit 23 receives data over the air interface 25 and the radio unit 22 from a base station 3 (FIG. 1), which data are processed in accordance with the system clock timing provided by the radio exchange 2 (FIG. 1). Signalling and synchronisation information are removed from the received data by the unit 23 and received speech data are fed to the speech processing unit 24. The speech processing unit 24, among others, takes care of the deciphering of received data. A codec 26 decodes the received digitised speech data into a form for making it audible to a user of the handset via a loudspeaker 27 connected to the codec 26.

Speech produced by the user is received by a microphone 28 and encoded into a suitable digital format by the codec 26. This encoded speech data is fed to the speech processing unit 24 which, among others, takes care of encryption of the speech data. The timing and synchronisation control unit 23 adds suitable synchronisation and signalling information to the encrypted speech data. The radio unit 22 transmits this signalling and speech data via the air interface 25 for reception by a base station 3 (FIG. 1) of the communication system to which the telephone set 20 is operatively connected.

The central control and application logic unit 21 comprises a microprocessor or microcontroller and memory means, and connects to the timing and synchronisation control unit 23. The central control unit 21 essentially controls the system data and the communication with the user of the radio telephone set 20 via a keypad means 29, display means 33 and ring generator means 30, all connected to the central control unit 21. Further, an external interface 35 connects to the central control unit 21 for external control and data processing purposes. Frame and time slot allocation and, in the case of a multi-carrier multi-time-slot technology such as DECT, also the various combinations of carrier frequencies and time-slots are controlled by the central control unit 21 and stored in the memory means.

The ring generator means 30 connect to a buzzer 31 for producing a ringing or alerting sound at the arrival of a call. Optionally a visual alerting signal may be emitted by a lamp or Light Emitting Diode (LED) 32, connected as shown. The display means 33, such as an LCD device, are operatively connected to the central control unit 21 for displaying call information and other user and system data.

For the overall powering of the telephone set 20 a battery and powering unit 34 is included.

In accordance with the present invention, the timing and synchronisation control unit 23 is controlled such to perform handover and roaming to synchronous as well asynchronous radio links.

Figure 7:
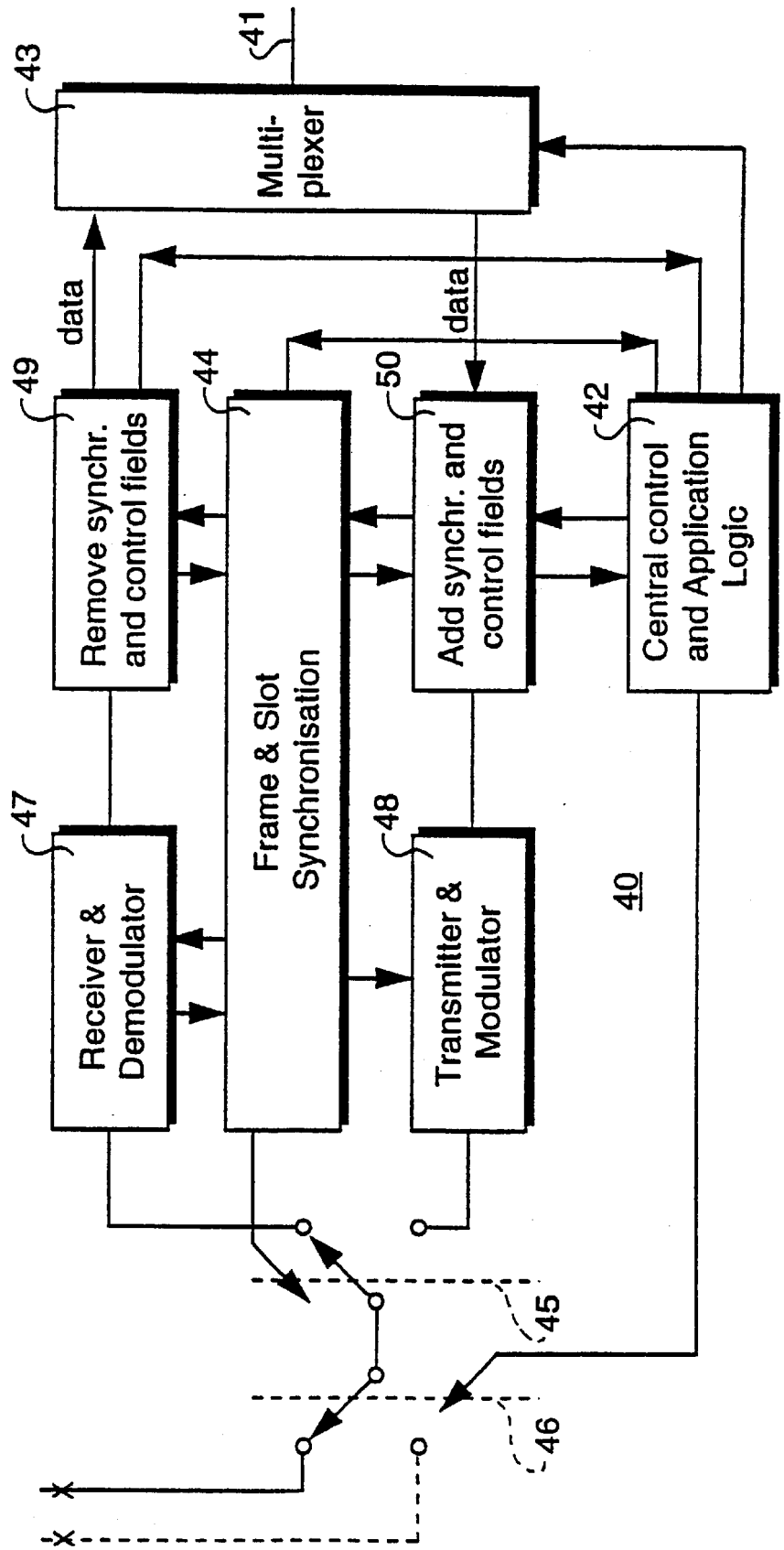
FIG. 7 shows a simplified block diagram of a radio access unit taking the form of a radio base station operating according to the present invention.

FIG. 7 shows a block diagram of a radio access unit 40 which operates in accordance with the DECT standard. The access unit 40 has a wired connection 41 to a radio exchange 2 shown in FIG. 1. Central control and application logic 42 detects incoming calls and controls outgoing calls and select suitable combinations of carrier and time slots in accordance with the DCA/CDCS algorithm. The different connections and time slots are merged via a multiplexer 43. The radio access unit 40 has a frame and slot synchronisation unit 44 which controls slot reception and transmission timing. The central control logic 42 also controls a Transmit/Receive (T/R) switch 45 and an antenna diversity switch 46, if antenna diversity is implemented.

With antenna diversity, if a radio connection provides no good communication, the control logic first tries the other antenna before changing the radio communication channel.

The radio interface of the access unit 40 consists of a receiver/demodulator 47 and a transmitter/modulator 48. Synchronisation and control information is stripped from received data by unit 49, whereas such information is added to the data to be transmitted by unit 50, connected as shown.

The frame and slot synchronisation unit 44 is controlled such to support handover in accordance with the present invention.

Although the present invention is generally illustrated with respect to a DECT radio telephone communication system, it is not restricted thereto. The present invention can be used with other communication devices, such as data communication equipment, as well as in other wireless multicell communication systems.

What is claimed is:

1. A scanning method for initiating handover of a call or roaming in a duplex radio communication system comprising radio access units and at least one remote radio communication unit, said radio access units and the or each remote radio communication unit being arranged for establishing a call at a radio link between a remote radio communication unit and a radio access unit, which radio link is selected from a plurality of predetermined radio links, and for switching a call in progress at a first radio link between a remote radio communication unit and a first radio access unit to a second radio link between said remote radio communication unit and a second radio access unit, wherein each or clusters of radio access units are operated in a mutually time asynchronous manner forming an asynchronous radio environment and said remote radio communication unit is synchronised to a first radio access unit, said method comprises the following steps performed by said remote radio communication unit:

a) scanning said radio environment for radio access units which operate in a time synchronous manner with said first radio access unit using a scan window having a width and/or position in time such to essentially retrieve synchronisation data and control data exchanged during a predetermined time period at a radio link operating time synchronous with said first radio link, b) scanning said radio environment for radio access units which operate in a time asynchronous manner with said first radio access unit using a scan window having a width and position in time such to retrieve synchronisation data and control data essentially exchanged outside said predetermined time period, c) maintaining a list of synchronous and asynchronous radio links available for handover, and d) evaluating said list on the basis of predetermined radio link criteria such to determine whether handover or roaming has to be initiated.

2. A method according to claim 1, wherein at step a) said remote communication unit synchronizes its timing reference to retrieved synchronisation data.

3. A method according to claim 1, wherein at step b) said scan window having a width and position in time such to include said predetermined time period, and wherein synchronous radio links and asynchronous radio links are distinguished on the basis of time difference between the receipt of synchronisation data and said predetermined time period.

4. A method according to claim 3, wherein said time difference is used by said remote communication unit to adjust its timing reference.

5. A method according to claim 1, wherein step a) and step b) are performed at different rates.

6. A method according to claim 5, wherein step a) is performed at a higher rate than step b) if a number of synchronous radio links adequately for handover is detected, said number and rate may be adoptively set subject to predetermined radio link criteria.

7. A method according to claim 1, wherein at step a) and step b) the number of radio links to be scanned is limited if a number of radio links adequately for handover is detected, said number may be adoptively set subject to predetermined radio link criteria.

8. A method according to claim 6, wherein said radio communication system operates in accordance with the Digital European Cordless Telecommunications (DECT) standard, and wherein said predetermined radio link criteria are formed by either one or a combination of the following criteria: RF signal level (RSSI), burst synchronisation (SYNC) error, system information field test word (A CRC) error, data field test word (X CRC) error.

9. A method according to claim 1, further comprising the steps of:
   e) suspending transmitting by said remote radio communication unit at said first radio link while maintaining transmitting by said first radio access unit at said first radio link,
   f) establishing said second radio link,
   g) resuming said call at said second radio link, and
   h) releasing said first radio link by said first radio access unit.

10. A method according to claim 9, wherein said first and second radio access units are operated in a mutually time asynchronous manner, and wherein said first and second radio access units may form part of first and second time independently operated radio communication networks, respectively.

11. A method according to claim 9, wherein during steps e) and 0 said first radio access unit maintains transmitting said call at said first radio link, and said remote radio communication unit maintains receiving said call at said first radio link.

12. A method according to claim 9, wherein at the start of a handover said remote communication unit forwards a transmit suspension message to said first radio access unit.

13. A method according claim 12, wherein upon receipt of said transmit suspension message by said first radio access unit a signaling message is exchanged for the purpose of indicating that said call is subjected to handover, which message at a terminal side may take the form of but not limited to a voice signal, an audio tone signal or a visual display signal, and wherein said signaling message is released if said call is resumed.

14. A method according to claim 9, wherein if said call is resumed at said second radio link, said first radio link is released after a predetermined time period following suspension of transmitting by said remote communication unit.

15. A method according to claim 9, wherein if said call is resumed at said second radio link, a release message is forwarded to said first radio access unit via its corresponding radio communication network in order to release said first radio link.

16. A method according to claim 9, wherein if said second radio link cannot be established, said call is resumed at said first radio link.

17. A method according to claim 16, wherein if said call cannot be resumed at said first radio link, a third radio link between said remote communication unit and said first radio access unit is established and said call is resumed at said third radio link.

18. A method according to claim 9, wherein said call is resumed maintaining call control features particular to said first radio link.

19. A communication unit comprising:
   a) means for scanning said radio environment for radio access units which operate in a time synchronous manner with said first radio access unit using a scan window having a width and/or position in time such to essentially retrieve synchronisation data and control data exchanged during a predetermined time period at a radio link operating time synchronous with said first radio link,
   b) means for scanning said radio environment for radio access units which operate in a time asynchronous manner with said first radio access unit using a scan window having a width and position in time such to retrieve synchronisation data and control data essentially exchanged outside said predetermined time period,
   c) means for maintaining a list of synchronous and asynchronous radio links available for handover, and
   d) means for evaluating said list on the basis of predetermined radio link criteria such to determine whether handover or roaming has to be initiated.

20. The communication unit of claim 19, wherein said communication unit is a radio telephone.

21. The communication unit of claim 19, wherein said communication unit is a base station.

* * * * *